United States Patent [19]

Frankl

[11] 4,186,560

[45] Feb. 5, 1980

[54] INTERNAL COMBUSTION ENGINES

[75] Inventor: George Frankl, Kenton, England

[73] Assignee: Lucas Industries Limited, Birmingham, England

[21] Appl. No.: 884,486

[22] Filed: Mar. 8, 1978

[30] Foreign Application Priority Data

Mar. 12, 1977 [GB] United Kingdom ............... 10575/77

[51] Int. Cl.² ...................... F02B 37/00; F02M 31/04
[52] U.S. Cl. .................................. 60/599; 123/122 G
[58] Field of Search .................. 60/599; 123/119 CD, 123/122 G; 432/222

[56] References Cited

U.S. PATENT DOCUMENTS

| | | | |
|---|---|---|---|
| 2,303,794 | 12/1942 | Pescara | 60/599 |
| 2,633,698 | 4/1953 | Nettel | 60/599 |
| 3,450,109 | 6/1969 | Gratzmuller | 60/599 X |
| 4,122,679 | 10/1978 | Charron | 60/599 |

FOREIGN PATENT DOCUMENTS 461237 4/1975 U.S.S.R. ..................................... 60/599
492674 2/1976 U.S.S.R. ..................................... 60/599

Primary Examiner—Michael Koczo

[57] ABSTRACT

An engine system includes a compression ignition engine, a turbo-supercharger for supplying air under pressure to the engine, an intercooler disposed between the outlet of the compressor of the turbo-charger and the engine, an air heater the output of which is connected to the engine and a valve operable to cause the air from the compressor to be delivered through the intercooler or through the air heater to the engine. In addition the valve can be opened a small amount when it is required to initiate combustion in the air heater so that only a small flow of air takes place through the heater. When the combustion has started the valve is moved to the position in which all the air from the compressor of the turbo-charger flows to the engine through the air heater.

1 Claim, 1 Drawing Figure

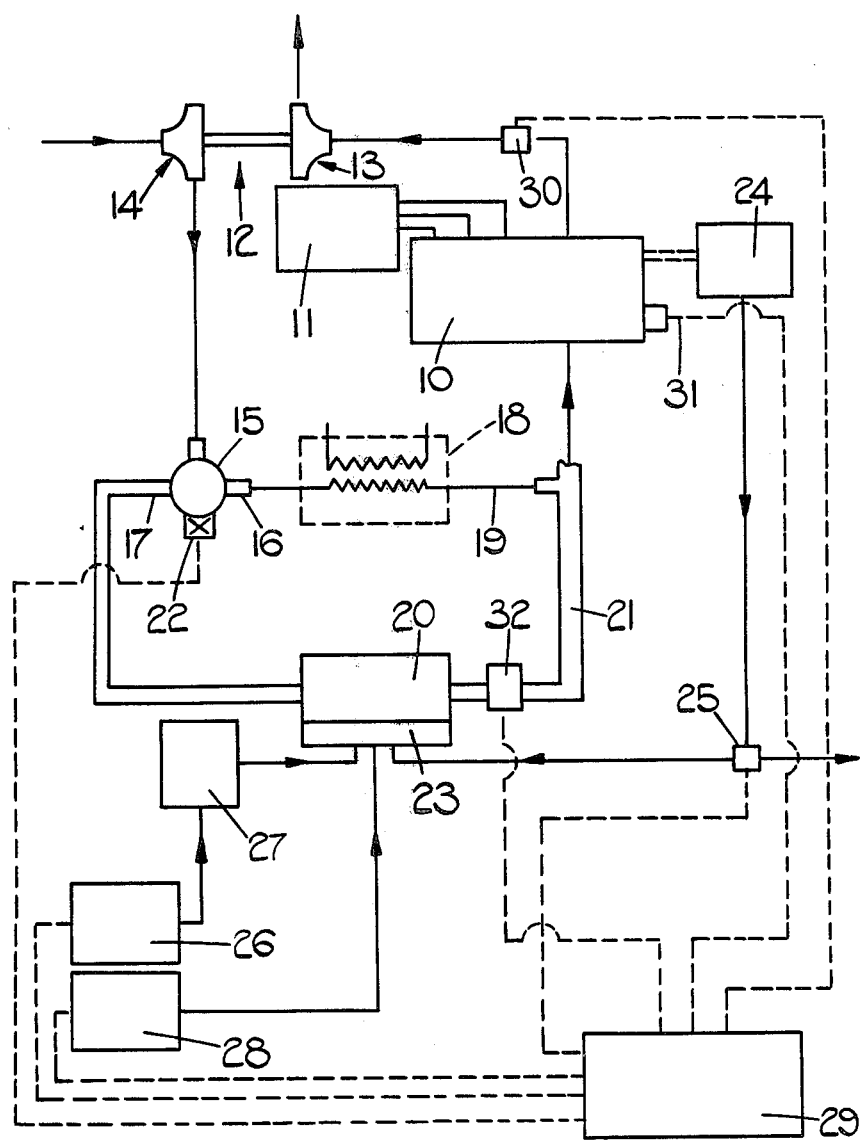

INTERNAL COMBUSTION ENGINES

This invention relates to an internal combustion engine system of the kind comprising a compression ignition engine, a turbo-supercharger for supplying air to the engine and means for supplying fuel to the combustion spaces of the engine.

With such a system the compression ratio of the engine must be chosen so that when the engine is operating at full load, the pressure in the cylinders of the engine does not rise to too high a value. Moreover, it is often necessary to cool the air as it is passed into the engine to increase the density thereof so that the mass of air which is contained in the engine cylinder prior to the start of the compression stroke, is as high as possible. Intercoolers in such systems are well known and are positioned between the engine air inlet manifold and the outlet of the compressor of the supercharger, the intercooler in effect acting to remove at least some of the heat imparted to the air during the compression process. One problem with such an engine system is that the low compression ratio of the engine leads to difficult starting of the engine and possibly poor low speed, low load running of the engine because during starting, the turbo-supercharger is not able to pressurise the air flowing to the engine and at low speeds and low loads the degree of pressurisation is comparatively low as compared with that obtained when the engine is operating at full load. As a result the temperature attained within the engine cylinder during the compression stroke of the engine may not be sufficient to cause proper ignition of the fuel which is delivered to the cylinder or the combustion space associated with that cylinder.

The object of the invention is to provide an engine system of the kind specified in a simple and convenient form.

According to the invention an engine system of the kind specified comprises an intercooler operable to cool the air flowing to the air inlet manifold of the engine through the compressor of the turbo charger, an air heater for heating the air flowing to the air inlet manifold through the compressor, a selector valve operable to direct the air flow through the intercooler and/or the air heater, valve control means for controlling the operation of said valve, means for providing a control signal when the air supplied to the engine requires to be heated, and a control network to which the control signal is supplied and which provides a signal to said valve control means to cause a small flow of air through said heater to enable combustion to start therein, the flow of air through the heater being increased when combustion has started whilst the flow of air through the intercooler is decreased.

One example of an engine system in accordance with the invention will now be described with reference to the accompanying drawing which shows a diagrammatic layout of the complete system.

Referring to the drawing the compression ignition engine is indicated at 10 and an engine driven fuel injection pump 11 is provided to supply fuel to the combustion spaces of the engine in timed relationship to the engine. Means not shown is provided to determine the amount of fuel supplied to the engine.

Also provided is a turbo-supercharger generally indicated at 12 and which comprises a turbine 13 having a rotor which is connected by means of a shaft to the rotor of a compressor 14. The inlet of the turbine is connected to the exhaust manifold of the engine so that the turbo-charger is driven by the exhaust gases leaving the engine. The outlet of the compressor is connected to the inlet of a selector valve 15 having two outlets 16, 17. Outlet 16 is connected to the inlet of an intercooler 18 and the air outlet of the intercooler is connected by way of first conduit means 19 to the air inlet manifold of the engine 10. The intercooler also includes connections whereby coolant can be supplied thereto. The outlet 17 of the valve is connected to the inlet of an air heater 20 the outlet of which is connected by second conduit means 21 to the inlet manifold of the engine. The valve 15 is controlled by an electromagnetic actuator 22 and the valve is constructed so that air can flow through both the intercooler and the air heater at the same time or through one or the other of these components.

The air heater 20 may be of the type described in our U.S. Pat. No. 4,044,740. It does however include a combustion chamber into which fuel can be sprayed by means of a burner assembly 23, the burner assembly having a fuel inlet for this purpose and also an air inlet to assist in the atomization of the fuel. In addition the burner assembly includes an electrical spark igniter to enable the fuel which is supplied by the burner assembly, to be ignited.

Fuel is supplied to the burner assembly by means of a fuel pump 24 which as shown, is driven by the engine but which may be driven by a separate electric motor the speed of which can be controlled. Interposed between the pump 24 and the burner assembly is a three-way valve 25 whereby in the case of the engine driven pump the fuel may be returned to a fuel tank instead of being supplied to the burner assembly. The pump 24 may be of the kind which is described in the complete specification of our U.S. Pat. No. 4,116,558. The pump is of the type in which the delivery is directly proportional to the speed at which the pump is driven and conveniently it comprises a pair of constant displacement pumps connected in series with a valve provided to ensure that the pressure drop across the second stage of the pump is substantially zero.

An air pump 26 is provided to supply air to the burner assembly, the air flowing by way of a non-return valve 27. In addition an igniter 28 is provided which supplies electrical energy to a spark discharge gap forming part of the burner assembly.

The operation of the valve 15, the air pump 26, the igniter 28, the valve 25 is controlled by an electronic control network generally indicated at 29. The control network receives input signals from an exhaust gas temperature sensor 30, an engine speed transducer 31 and an air temperature sensor 32 which is disposed downstream of the air heater 20. Where the pump 24 is controlled electrically, such control will be effected by the control network 29.

As mentioned the engine 10 whilst being a compression ignition engine, has a lower compression ratio than a naturally aspirated compression ignition engine. This is to ensure that the cylinder pressure which occurs when the engine is operating at full load, is not excessive. The problem with such engines is that they are difficult to start because at cranking speeds the turbosupercharger is ineffective and therefore the engine is operating as a naturally aspirated engine. With the low compression ratio however the temperature which is attained in the cylinders and combustion spaces of the engine at the end of the compression stroke is lower than in the case of a compression ignition engine which is designed to operate without a turbo-supercharger. The air heater is therefore provided to heat the air flowing to the engine to facilitate starting of the engine and also to ensure that the engine does run properly at low engine speeds and loads. The intercooler is provided to ensure that the heat which is imparted to the air by the compressor of the supercharger and which therefore reduces the density of the air, is at least partly removed so that the air density is increased. This results in an increase in the mass of air which is contained within the cylinders and combustion spaces of the engine at the beginning of the compression stroke. With such an engine it is often necessary when the engine load is reduced to bring the air heater into operation so as to ensure that the engine operates properly at low speeds and loads. It is therefore necessary to be able to establish the flame in the air heater whilst the engine speed is reducing and the fact that the intercooler and air heater are connected in parallel so that air can flow through both components, facilitates this operation. If the air heater were connected in series with the intercooler then there would be a high flow of air in the air heater and this would make it difficult to establish the flame in the air heater whilst the engine was slowing down. Furthermore it would be necessary to render the intercooler inoperative.

The operation of the system will now be described assuming firstly that the engine is at rest and is cold. When the starter of the engine is operated a speed signal will be supplied to the control network by the transducer 31 and upon receiving this signal the actuator 22 is operated so that the valve 15 directs all the air through the heater. In addition the valve 25 is operated so that fuel flows to the burner assembly and the air pump 26 and the igniter 28 are rendered operative. When the flame is established in the heater a temperature rise will be detected by the sensor 32 and the igniter 28 can then be turned off if so required. The sensor 32 also forms part of a safety system so that if a rise in temperature is not detected within a predetermined time, the valve 25, the pump 26 and the igniter 28 are operated to prevent further supply of fuel, air and electrical energy to the burner assembly.

Assuming that the flame in the air heater is properly established and the engine starts, as the engine speed rises the output of the fuel pump 24 increases proportionally to maintain a substantially constant air temperature. As the engine load increases the energy in the exhaust gas will also increase and thereby the turbo-supercharger will become operative. The increased energy in the exhaust gas will be detected by the sensor 30 which supplies a signal to the control network 29 which causes the fuel supplied by the pump 24 to be diverted to the tank and in addition halts the operation of the air pump 26. Where the pump 24 is driven by a motor and not be the engine, the operation of the pump would also be halted. In addition the actuator 22 changes the valve 15 so that air is now supplied to the engine through the intercooler 18.

If the engine load should decrease this will result in a reduction in the energy in the exhaust and a lowering of the exhaust gas temperature. This is sensed by the sensor 30 and the network 29 then turns on the igniter 28, the air pump 26, changes the state of the valve 25 or starts the pump 24, and in addition provides a signal to the actuator 22 to move the valve 15 to cause a small flow of air through the heater 20. When ignition of the fuel in the heater takes place, this is sensed by the sensor 32 and the valve 15 is moved to ensure that all the air flows through the heater.

I claim:

1. An internal combustion engine system including a compression ignition engine, a turbosupercharger for supplying air under pressure to the engine, means for supplying fuel to the combustion spaces of the engine, an intercooler operable to cool the air flowing to the air inlet manifold of the engine through the compressor of the turbo charger, an air heater for heating the air flowing to the air inlet manifold through the compressor, a fuel burner assembly located within the air heater and operable in use to cause fuel to be burnt in the air flowing to the engine to effect heating of the air, a selector valve operable to direct the air flow through the intercooler and/or the air heater, valve control means for controlling the operation of said valve, means for providing a control signal when the air supplied to the engine requires to be heated, and a control network to which the control signal is supplied and which provides a signal to said valve control means to cause a small flow of air through said heater to enable combustion to start therein, the flow of air through the heater being increased when combustion has started whilst the flow of air through the intercooler is decreased.

* * * * *